(12) United States Patent
Kurumaddali (10) Patent No.: US 11,906,772 B2
(45) Date of Patent: Feb. 20, 2024

(54) BACKLIGHT MODULE

(71) Applicant: Microsoft Technology Licensing, LLC, Redmond, WA (US)

(72) Inventor: Nalini Kanth Kurumaddali, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/040,543

(22) PCT Filed: Aug. 6, 2021

(86) PCT No.: PCT/US2021/071128
§ 371 (c)(1),
(2) Date: Feb. 3, 2023

(87) PCT Pub. No.: WO2022/040657
PCT Pub. Date: Feb. 24, 2022

(65) Prior Publication Data
US 2023/0305212 A1 Sep. 28, 2023

(30) Foreign Application Priority Data
Aug. 18, 2020 (NL) ..................................... 2026289

(51) Int. Cl.
*G02B 6/00* (2006.01)
*F21V 8/00* (2006.01)
(52) U.S. Cl.
CPC .......... *G02B 6/0021* (2013.01); *G02B 6/0065* (2013.01); *G02B 6/0068* (2013.01); *G02B 6/0091* (2013.01)

(58) Field of Classification Search
CPC .. G02B 6/0021; G02B 6/0065; G02B 6/0068; G02B 6/0091
See application file for complete search history.

(56) References Cited

U.S. PATENT DOCUMENTS 8,033,676 B2  10/2011  Lee et al.
8,223,296 B2   7/2012  Lee et al.
(Continued)

FOREIGN PATENT DOCUMENTS

CN   203703748 U   7/2014
CN   206378663 U   8/2017
(Continued)

OTHER PUBLICATIONS

Mcnamara, Tyler, "What Is A Light Guide Plate?", Retrieved From: https://web.archive.org/web/20130617114222/https://www.evo-lite.com/what-is-a-light-guide-plate, Jan. 25, 2013, 2 Pages.
(Continued)

*Primary Examiner* — Gerald J Sufleta, II
(74) *Attorney, Agent, or Firm* — Alleman Hall Creasman & Tuttle LLP (57) ABSTRACT

Examples are disclosed that relate to backlight modules, displays including a backlight module, and methods for assembling a backlight module. In one example, a backlight module for a display comprises light sources affixed to a printed circuit and a light guide plate. An adhesive affixes the printed circuit to the light guide plate. The light guide plate comprises a body and a plurality of projections extending from the body, with the plurality of projections retaining two or more of the light sources between the projections and the body of the light guide plate.

20 Claims, 11 Drawing Sheets

(56) References Cited

U.S. PATENT DOCUMENTS

| | | | |
|---|---|---|---|
| 8,976,320 B2 | 3/2015 | Tang et al. | |
| 9,280,011 B2 | 3/2016 | Ikuta | |
| 10,454,004 B2 | 10/2019 | Kwon et al. | |
| 10,627,568 B2 | 4/2020 | Tanaka et al. | |
| 2004/0141305 A1 | 7/2004 | Higashiyama | |
| 2007/0035842 A1* | 2/2007 | Suh | G02B 6/0021 359/599 |
| 2007/0076433 A1* | 4/2007 | Kinoshita | G02B 6/0028 362/616 |
| 2008/0043171 A1 | 2/2008 | Takahashi et al. | |
| 2009/0016079 A1 | 1/2009 | Mizutani | |
| 2009/0051846 A1 | 2/2009 | Horiuchi et al. | |
| 2010/0110727 A1* | 5/2010 | Iwasaki | G02B 6/0088 362/613 |
| 2011/0051042 A1 | 3/2011 | Sato et al. | |
| 2012/0155109 A1 | 6/2012 | Hayashi et al. | |
| 2012/0182497 A1* | 7/2012 | Qi | G02B 6/0068 349/62 |
| 2012/0242929 A1 | 9/2012 | Ohyama | |
| 2013/0063679 A1 | 3/2013 | Tang et al. | |
| 2013/0301295 A1 | 11/2013 | Iwasaki et al. | |
| 2016/0139317 A1* | 5/2016 | Tai | G02B 6/0021 362/628 |
| 2017/0068037 A1 | 3/2017 | Lin et al. | |
| 2017/0285241 A1* | 10/2017 | Zhang | G02B 6/0091 |
| 2018/0017728 A1* | 1/2018 | Edamitsu | G02B 6/0068 |

FOREIGN PATENT DOCUMENTS

| | | |
|---|---|---|
| JP | 2004111114 A | 4/2004 |
| JP | 2006171253 A | 6/2006 |
| JP | 2006228441 A | 8/2006 |
| JP | 2008251298 A | 10/2008 |
| KR | 20060134539 A | 12/2006 |
| KR | 20070074890 A | 7/2007 |
| KR | 20070076862 A | 7/2007 |
| KR | 101486311 B1 | 1/2015 |
| KR | 20160059584 A | 5/2016 |
| WO | 2013048161 A2 | 4/2013 |
| WO | 2016187899 A1 | 12/2016 |
| WO | 2019154930 A1 | 8/2019 |

OTHER PUBLICATIONS

"Search Report Issued in Netherlands Patent Application No. N2026289", dated May 19, 2021, 12 Pages.

"International Search Report & Written Opinion issued in PCT Application No. PCT/US21/071128", dated Jan. 25, 2022, 15 Pages.

* cited by examiner

BACKLIGHT MODULE

CROSS REFERENCE TO RELATED APPLICATIONS

The present application is a U.S. National Phase of International Patent Application Serial No. PCT/US2021/071128, filed Aug. 6, 2021, which claims priority to Netherlands Patent Application Serial No. 2026289, filed Aug. 18, 2020, the entire contents of each of which are hereby incorporated by reference for all purposes.

BACKGROUND

In a liquid crystal display, a backlight module provides illumination for the display. In some examples, the backlight module includes a light guide plate that receives light from light sources, such as light emitting diodes (LEDs) located along an edge of the light guide plate.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to backlight modules, displays including a backlight module, and methods for assembling a backlight module. In one example, a backlight module for a display comprises a plurality of light sources affixed to a printed circuit and a separate light guide plate. An adhesive affixes the printed circuit to the light guide plate. The light guide plate comprises a body and a plurality of projections extending from the body, with the plurality of projections retaining two or more of the plurality of light sources between the projections and the body of the light guide plate.

In another example, a method for assembling a backlight module includes providing light sources affixed to a printed circuit and a light guide plate comprising a body and projections extending from the body. The printed circuit is affixed to the light guide plate such that the plurality of projections retain two or more of the plurality of light sources between the projections and the body of the light guide plate.

DETAILED DESCRIPTION

In a liquid crystal display, a backlight module provides illumination for the display. In some examples, the backlight module includes a light guide plate that receives light from light sources, such LEDs. Individual LEDs are spaced apart and positioned along an edge of the light guide plate. Light from the LEDs travels into the light guide plate and is directed through the liquid crystal cell and cover glass of the display.

To provide desired brightness and image uniformity for the display, the LED's are closely coupled to the light guide plate. In some examples, the LEDs are initially positioned flush against the light guide plate or within a small distance, such as 0.2 millimeters (mm) or less. To achieve such close coupling, in some examples the flexible printed circuit to which the LEDs are mounted is bonded to the light guide plate using an adhesive. Over time, however, thermal cycling causes the light guide plate to expand and contract. In some examples of displays for laptop computers, thermal expansion can cause the light guide plate to extend 0.5 mm or more toward the LEDs, followed by subsequent contraction upon cooling. Such expansion and contraction can cause the adhesive to delaminate from the light guide plate and create a gap between the LEDs and the light guide plate that can grow over the lifecycle of the display. Such increased gaps lead to brightness and uniformity declines in the display, which correspondingly causes accelerated component wear and increased power draws that reduce battery life.

Figure 1:
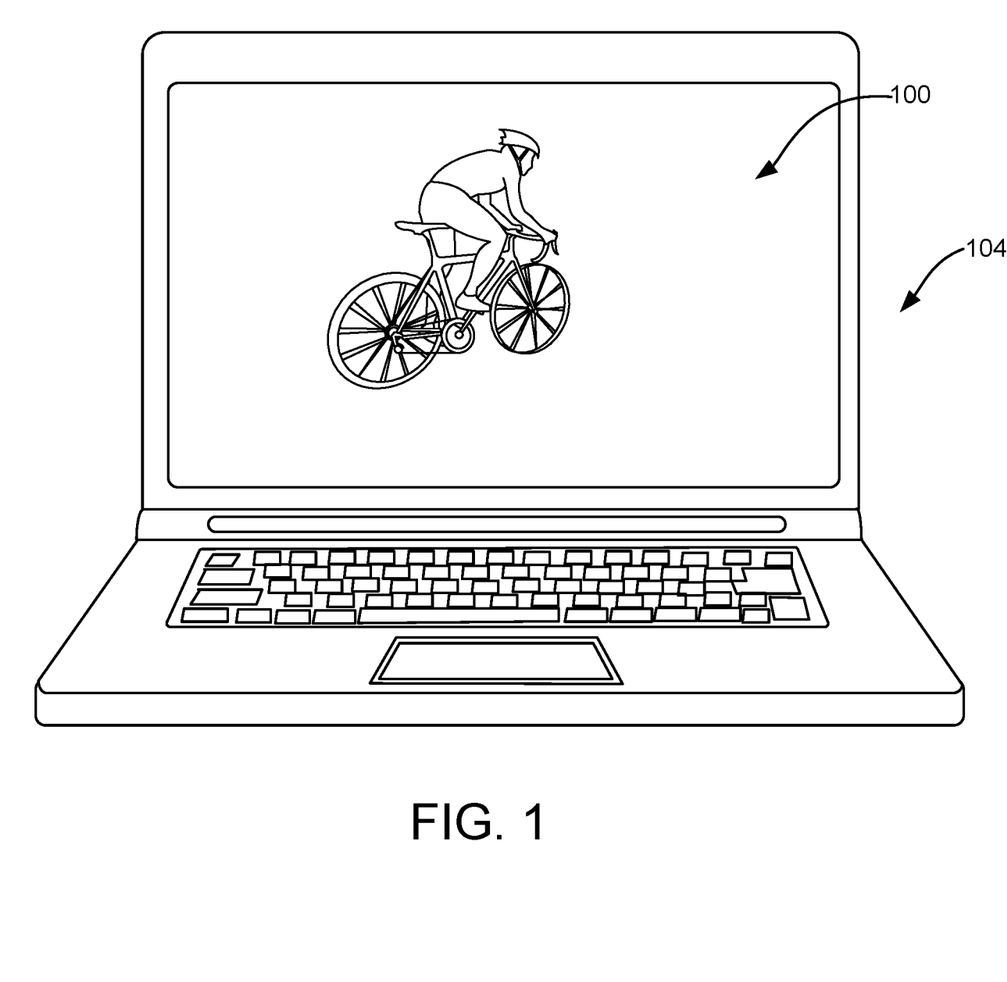
FIG. 1 shows a laptop computing device that utilizes a backlight module according to examples of the present disclosure.

Accordingly, examples are disclosed that relate to backlight modules for displays that address one or more of the above issues. With reference now to FIG. 1, one example of a display 100 that utilizes a backlight module of the present disclosure is provided in the form of laptop computing device 104. The example of the laptop computing device 104 is provided for purposes of illustration and is not intended to be limiting. Other examples of devices that can use backlight modules and displays of the present disclosure include, but are not limited to, tablet computers, desktop monitors, gaming devices, mobile computing devices, and mobile communication devices (e.g., smart phones).

Figure 2:
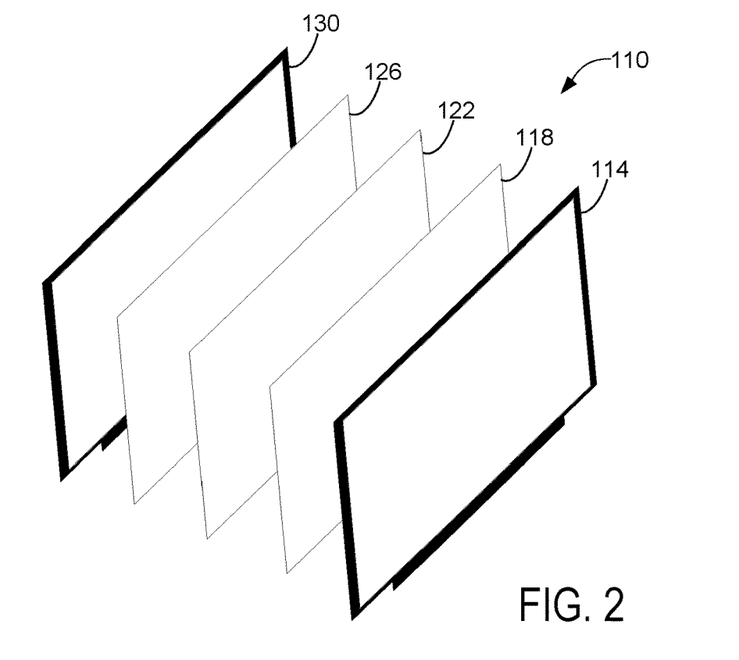
FIG. 2 shows a schematic exploded view of components of a touch and display module according to examples of the present disclosure.

With reference now to FIG. 2, the example display 100 includes a touch and display module (TDM) 110. As shown in this exploded view, the TDM 110 includes a cover glass portion 114 and an optically clear adhesive layer 118 that bonds the cover glass to a capacitive touch sensor layer 122. The touch sensor layer 122 is bonded to an underlying liquid crystal module 130 by another optically clear adhesive layer 126. In other examples, different touch sensor technologies, such as a resistive touch-sensitive layer, may be utilized for the touch sensor layer. Additionally, in some examples the TDM 110 can include one or more additional layers or components.

Figure 3:
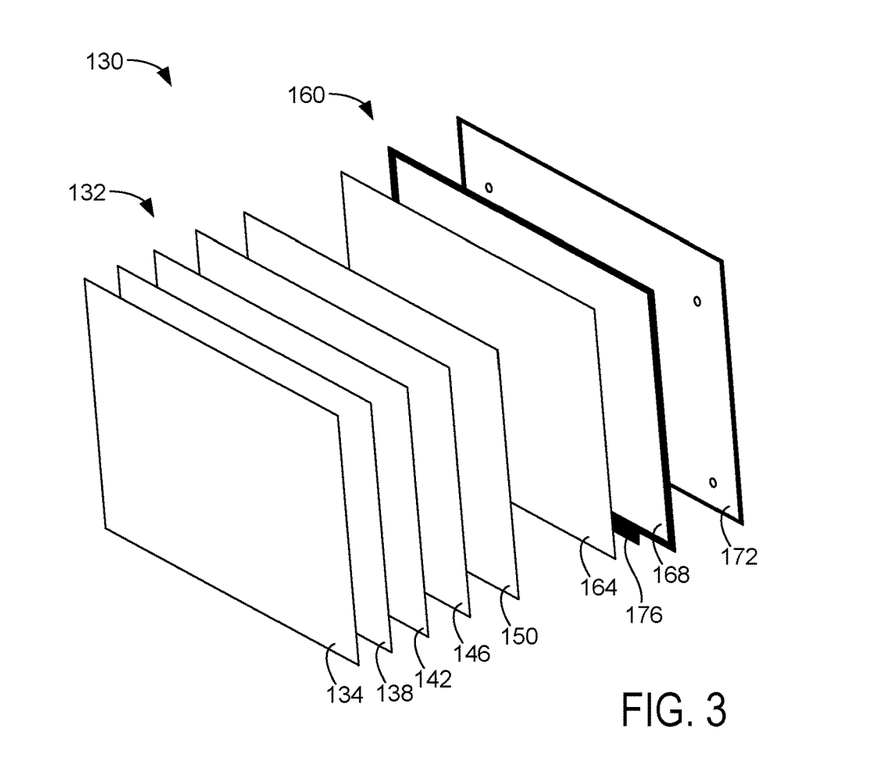
FIG. 3 shows a schematic exploded view of components of a liquid crystal module and backlight module according to examples of the present disclosure.

With reference now to FIG. 3, the liquid crystal module 130 includes a liquid crystal cell 132 and a backlight module 160. The liquid crystal cell 132 comprises a top polarizer layer 138, a color filter glass layer 142, a thin-film-transistor (TFT) glass layer 146, and a bottom polarizer layer 150. In this example, a cover glass substrate 134 is provided adjacent to the top polarizer layer 138. In other examples, the liquid crystal module can include additional layers, films and/or substrates, such as surface protection films, sealing films, alignment layers, etc.

Underlying the liquid crystal module is the backlight module 160. The backlight module 160 includes a diffuser layer 164, a light guide plate 168 and a reflector substrate 172. As described in more detail below, the backlight module also includes a plurality of light sources mounted on a flexible printed circuit 176 that is affixed to the light guide plate 168. In other examples, the backlight module can include one or more additional layers, films and/or substrates, such as surface protection films, prisms, sealing films, alignment layers, etc.

Figure 4:
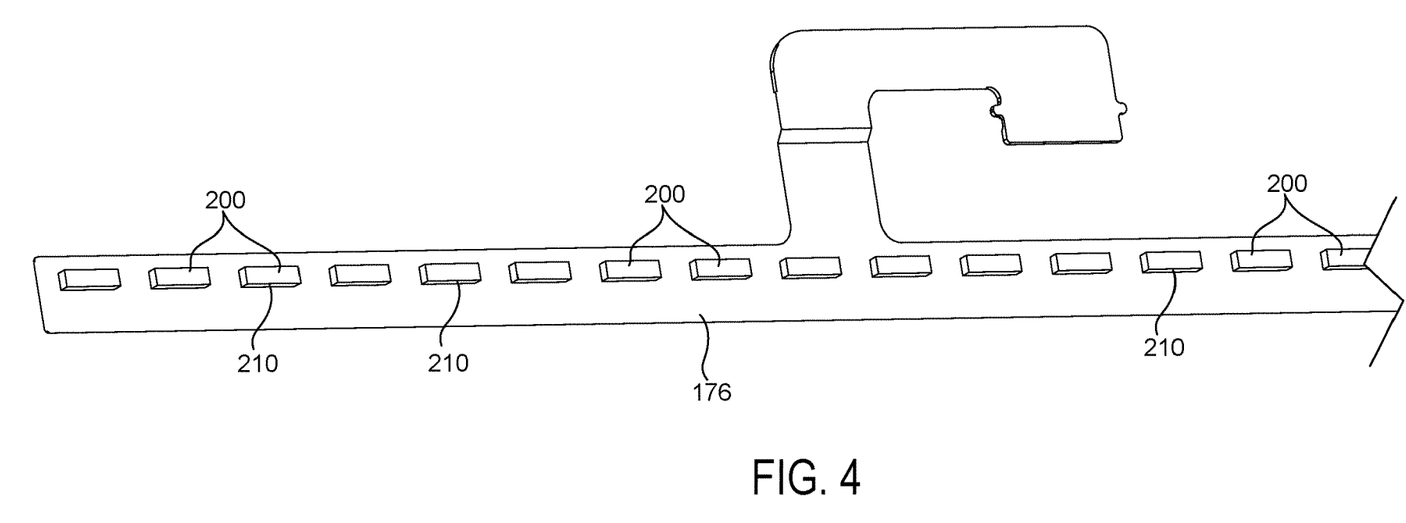
FIG. 4 illustrates a partial view of a printed circuit with surface-mounted LEDs according to examples of the present disclosure.

In the present example and with reference to FIG. 4, the plurality of light sources of the backlight module take the form of individual LEDs 200 that are surface mounted to flexible printed circuit 176. FIG. 4 shows a portion of the LEDs 200 and printed circuit 176. As described in more detail below, when mounted to the light guide plate 168 the printed circuit 176 and LEDs 200 span across the width of the light guide plate. Additionally, the printed circuit 176 is affixed to the light guide plate 168 in a manner that positions the light-emitting side of each LED 200 adjacent to the body of the light guide plate.

Figure 5:
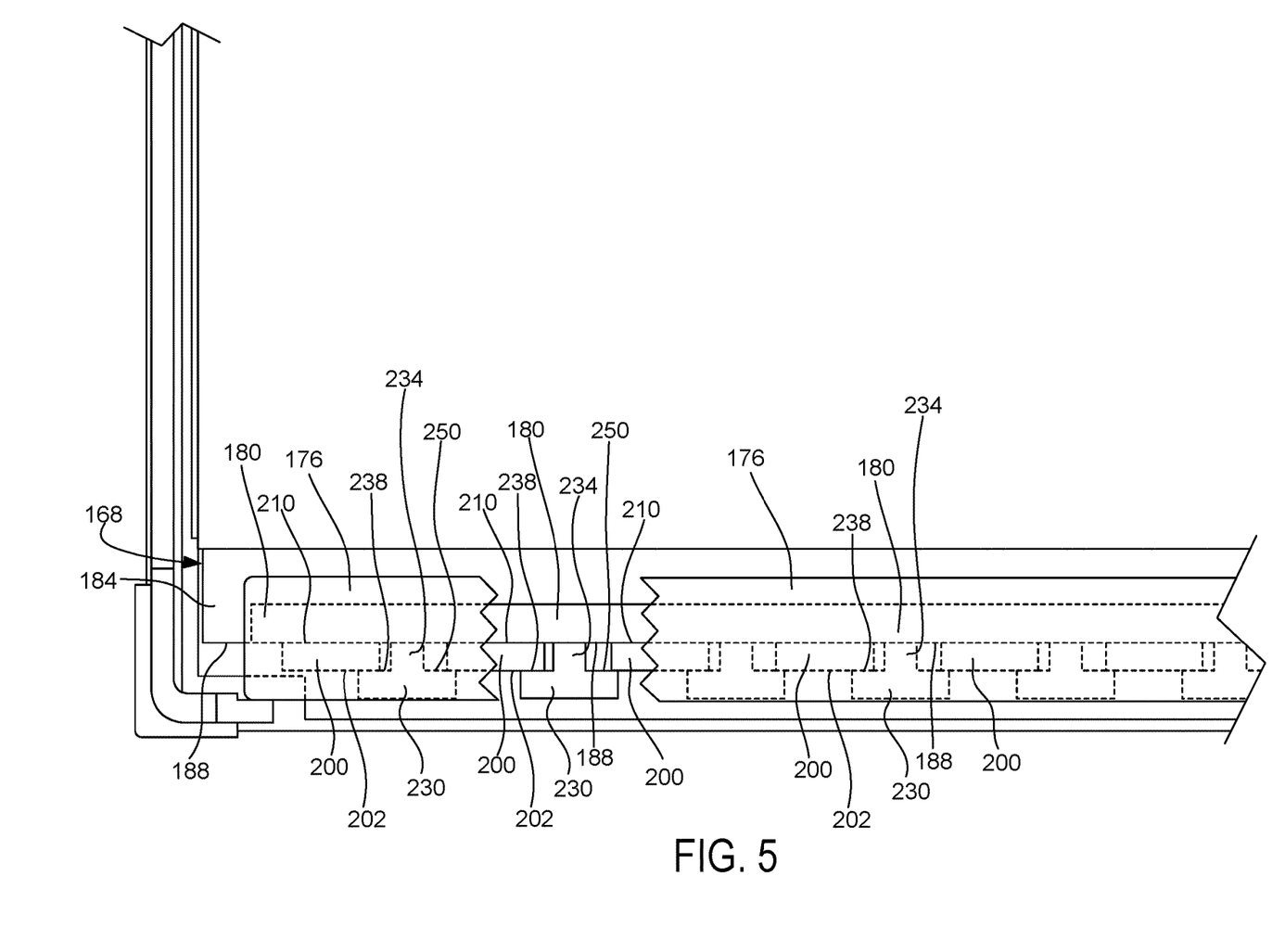
FIG. 5 shows a partial cutaway view of a backlight module according to examples of the present disclosure.
Figure 6:
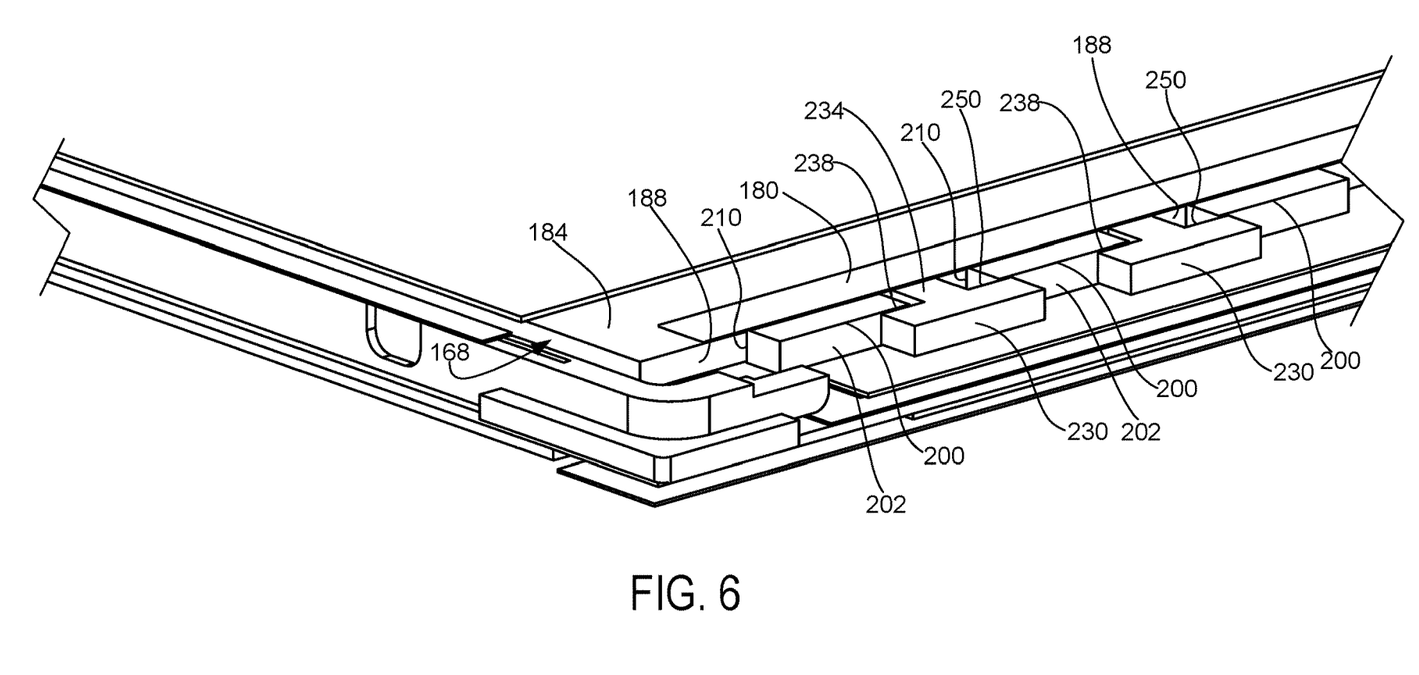
FIG. 6 shows another partial view of the backlight module of FIG. 5 according to examples of the present disclosure.

For example and with reference now to FIG. 5, in one example the printed circuit 176 (shown in partial cutaway) is affixed to a body 184 of the light guide plate 168 via an optically clear adhesive 180. In this example, the printed circuit 176 is positioned and affixed relative to the body 184 of the light guide plate 168 such that the light-emitting side 210 of each LED 200 is contacting an end face 188 of the body 184 of the light guide plate 168. FIG. 6 illustrates another view of this example (with the printed circuit not shown for clarity) showing a portion of the light guide plate 168, optically clear adhesive 180, and LEDs 200. In this configuration, light from the LEDs 200 is projected into the light guide plate 168 and subsequently directed through the liquid crystal cell and cover glass of the display.

As noted above, in some displays thermal cycling can cause the light guide plate to expand and contract. Such expansion and contraction can cause an adhesive bonding the printed circuit to the light guide plate to delaminate from the light guide plate, and undesirable gaps between the LEDs and the light guide plate can form and grow over time. Accordingly, with reference to the example of FIGS. 5-8 and as described in more detail below, to address these potential issues the light guide plate 168 includes integrally-formed projections 230 that retain two or more of the LEDs 200 between the projections and the body 184 of the light guide plate, thereby maintaining the LEDs against or in close proximity to the light guide plate.

Figure 7:
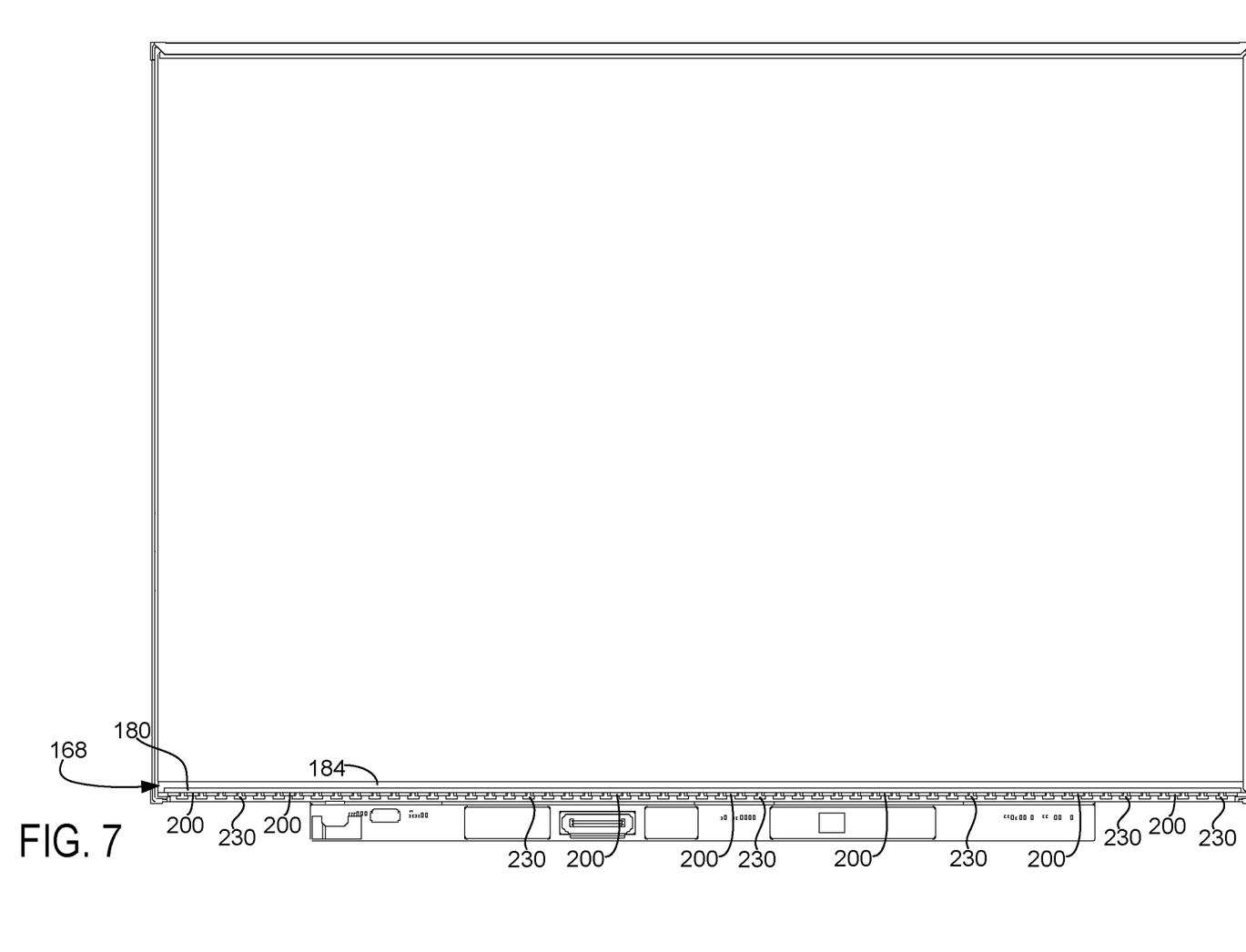
FIG. 7 shows the light guide plate of FIG. 6 including projections spanning the width of the light guide plate according to examples of the present disclosure.

As shown in the example of FIG. 7 (which does not show the printed circuit for clarity), the projections 230 span the width of the light guide plate 168 such that each of the LEDs 200 are retained by at least one of the projections. Additionally and in this example, the plurality of projections 230 are evenly spaced across the body 184 of the light guide plate 168. In this manner, the projections 230 accommodate and retain LEDs 200 that are also evenly spaced across the light guide plate 168 to provide a uniform and consistent supply of light to the light guide plate.

Figure 8:
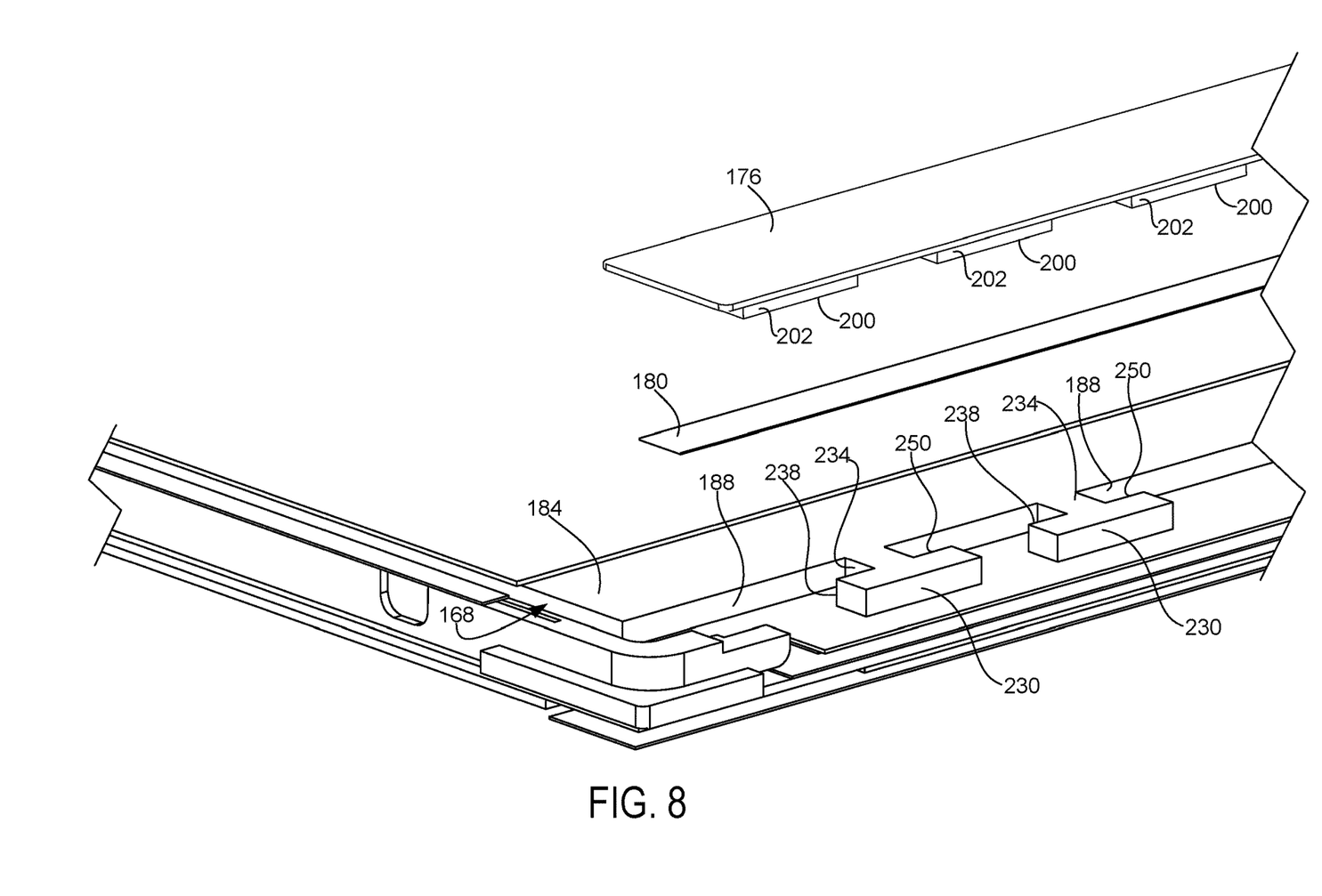
FIG. 8 shows a partial exploded view of the light guide plate, adhesive, and printed circuit with LEDs of the backlight module of FIG. 5 according to examples of the present disclosure.

As best seen in the exploded view of FIG. 8, the light guide plate 168 and the projections 230 are integrally molded as a unitary structure. By forming the light guide plate 168 and projections 230 as a unitary structure, the structural integrity of the projections is enhanced and dimensional tolerances of the projections can be precisely controlled. In some examples, the light guide plate 168 with projections 230 is formed by an injection molding process. In other examples, the light guide plate 168 with projections 230 can be formed by 3D printing or other suitable manufacturing techniques.

With reference now to FIGS. 5, 6, and 8, each projection 230 comprises an extension portion 234 that extends from the body 184 of the light guide plate 168 between two adjacent LEDs 200. In this example, each of the extension portions extends perpendicularly from the end face 188 of the body 184 of the light guide plate 168. As best seen in FIGS. 5 and 8, each of the projections 230 comprises a first retention surface 238 extending from an end of the extension portion 234 for the projection, with the first retention surface spaced from the end face 188 of the body 184 of the light guide plate 168.

As shown in FIGS. 5 and 6, the first retention surface 238 retains an LED 200 between the first retention surface and the end face 188 of the body 184 of the light guide plate 168. More particularly, the first retention surface 238 is positioned adjacent to a rear side 202 of the LED 200 that is opposite to the light-emitting side 210 of the LED. In this example, the first retention surface 238 contacts the rear side 202 of the LED 200 As noted above, in this example the light-emitting side 210 of each LED 200 is adjacent to and contacting the end face 188 of the body 184 of the light guide plate 168. In other examples and as described below, a light guide plate and projections are configured to retain LEDs 200 between the projections and the body of the light guide plate in a manner that enables a small gap between the light-emitting side 210 of each LED 200 and the end face 188 of the body 184 of the light guide plate 168 and/or a small gap between the first retention surface 238 and the rear side 202 of the LED 200.

With reference again to FIGS. 5, 6, and 8, each of the projections 230 also comprises a second retention surface 250 extending from the end of the extension portion 234 in a direction opposite to the first retention surface 238. Like the first retention surface 238, the second retention surface 250 is spaced from the end face 188 of the body 184 of the light guide plate 168. The second retention surface 250 retains a different LED 200 between the second retention surface and the end face 188 of the body 184 of the light guide plate 168. More particularly and as illustrated, the second retention surface 250 retains the LED 200 immediately to the right of the LED 200 that is retained by the first retention surface 238. In this example, the first retention surface 238 and the second retention surface 250 are perpendicular to the extension portion 234 of each projection 230.

In this manner, with the present configuration each projection 230 is configured to retain a portion of two adjacent LEDs 200 against the end face 188 of the body 184 of the light guide plate 168. Further and as shown in FIGS. 5 and 6, in this configuration the first retention surface 238 of a first projection 230 and the second retention surface 250 of a second projection adjacent to the first projection retain opposite portions of one LED 200 against the end face 188 of the body 184 of the light guide plate 168. Additionally, and in one potential advantage of the present disclosure, because the projections 230 are integrally formed with the light guide plate 168, the projections maintain the retention of the LEDs 200 between the projections and the body 184 of the light guide plate over the lifecycle of the display. In this manner, the disclosed configuration reduces or eliminates gaps between the LEDs and the light guide plate that otherwise could form due to expansion and contraction of the light guide plate and/or other environmental factors experienced over the lifecycle of the display. This enables the present configuration to avoid brightness and uniformity declines in the display, and thereby reduce component wear and power draws to improve battery life.

In some examples and as noted above, one or more of the projections 230 retain LEDs 200 between the projections and the body of the light guide plate while allowing for a small gap between the light-emitting side 210 of each LED 200 and the end face 188 of the body 184 of the light guide plate 168. For example and with reference now to FIG. 9, a light guide plate 169 and integrally molded projections 230 are formed to allow a front gap 260 between the light-emitting side 210 of each LED 200 and the end face 188 of the body 184 of the light guide plate 169. In this example, the first retention surfaces 238 of projections 230 also define a rear gap 264 between the first retention surfaces and the rear side 202 of the corresponding LED 200. Similarly, the second retention surfaces 250 define a rear gap 266 between the second retention surfaces and the rear side 202 of the adjacent LED 200.

Figure 9:
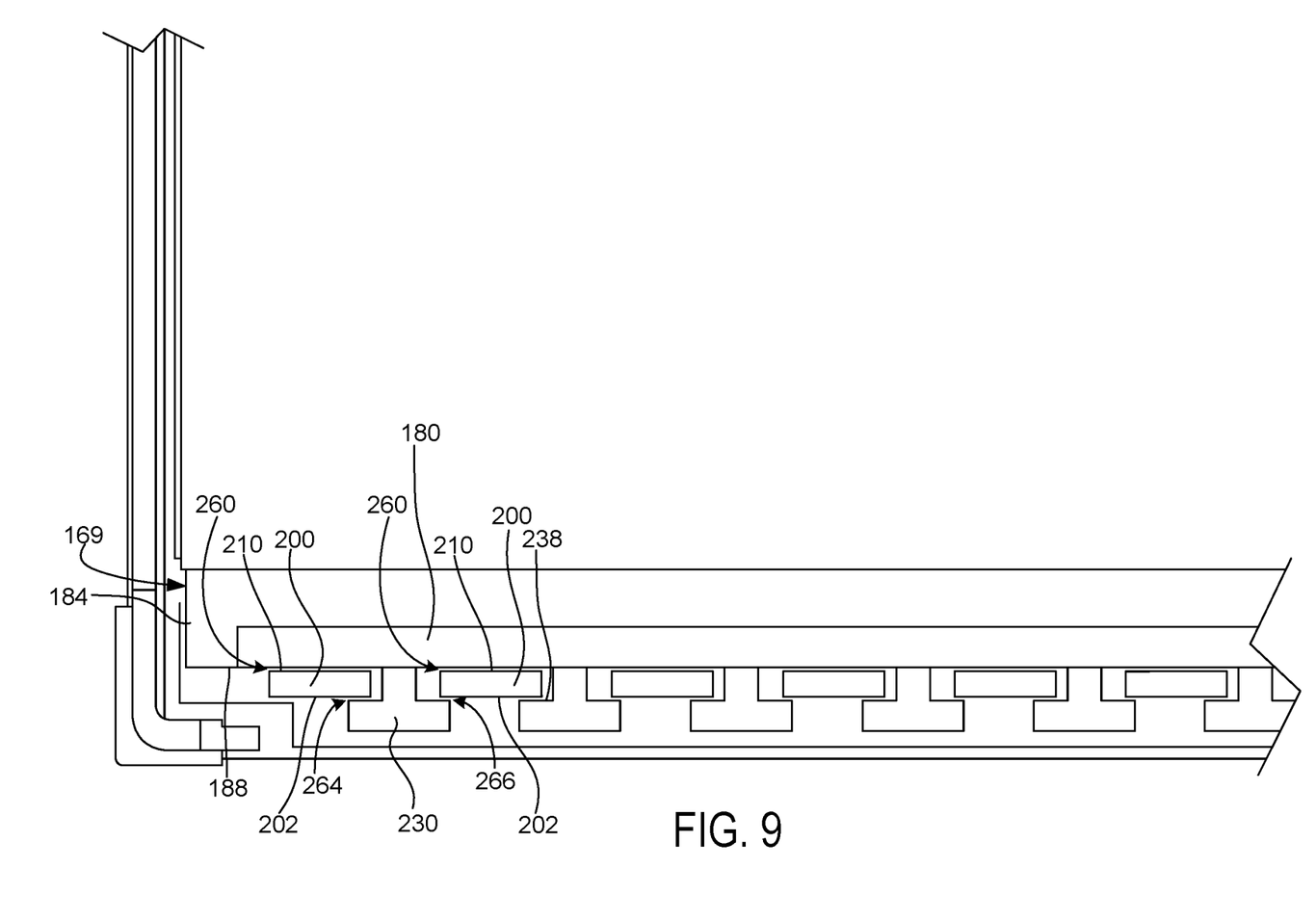
FIG. 9 shows a partial view of another light guide plate for a backlight module according to examples of the present disclosure.

In some examples, to maintain sufficient and uniform screen brightness and avoid visual artifacts such as gray patterns in a display, the projections 230 are designed and dimensioned to allow a maximum front gap 260 of 0.2 mm or less between the light-emitting side 210 of each LED 200 and the end face 188 of the body 184 of the light guide plate 169. In this manner, the projections 230 are configured to cooperate with the LEDs 200 to allow limited movement of the LEDs away from and toward the end face 188 of the body 184 of the light guide plate 169. In these examples, the allowance for such movement enables the LEDs and attached printed circuit 176 to move in a limited fashion with the expansion/contraction of the light guide plate 168. In one potential advantage of these examples, such movement can reduce stresses imparted to the LEDs 200 and printed circuit 176 by the projections 230 and/or other components of the light guide plate 169.

In other examples and based on different display requirements, component geometries and sizes, and/or other factors, the projections 230 are designed and dimensioned to allow a front gap 260 of 0.4 mm or less, 0.6 mm or less, or other desired range of distances between the light-emitting side 210 of each LED 200 and the end face 188 of the body 184 of the light guide plate 169.

In the foregoing examples, the projections 230 span the width of the light guide plates 168 and 169 such that each of the LEDs 200 are retained by at least one of the projections. In other examples, one or more of the LEDs 200 are not retained by a projection of the light guide plate. In these examples, the projections are spaced from one another to retain a subset of the LEDs 200 spanning across the light guide plate.

Figure 10:
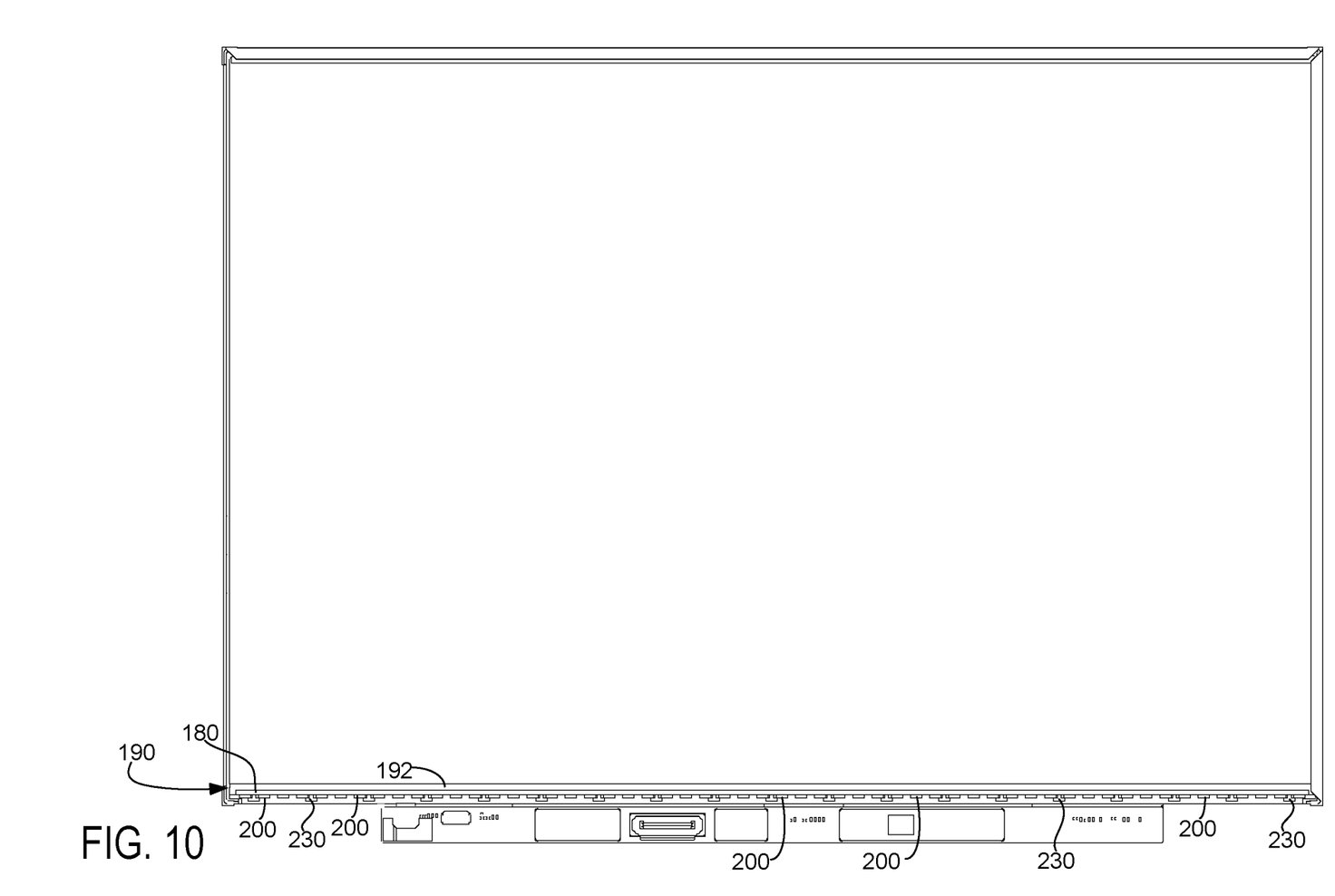
FIG. 10 shows another light guide plate including projections spaced from one another to retain a subset of LEDs across the light guide plate according to examples of the present disclosure.

For example and with reference to FIG. 10, another light guide plate 190 includes projections 230 that are spaced from one another in a manner such that each projection 230 retains a portion of two adjacent LEDs 200 as described above, and such that one LED 200 located between two succeeding projections 230 is left unretained. In other examples, different numbers of projections 230 and/or different spacings of the projections across the light guide plate 190 may be utilized. For example, projections 230 may be provided between every other pair of LEDs 200, every $5^{th}$ pair of LEDs, every $10^{th}$ pair of LEDs, or at other spacings.

In this example, the light guide plate 190 utilizes fewer total projections 230 as compared to examples in which every LED 200 is retained by at least one projection of the light guide plate. Accordingly, this configuration may function to retain select LEDs 200 across the light guide plate 190 while also simplifying the fabrication of the light guide plate. The fewer number of projections 230 also may facilitate an simplified assembly process in which the LEDs 200 are placed between the first retention surface 238 and second retention surface 250 of each projection 230, and the printed circuit (not shown in FIG. 10) is affixed to the body 192 of the light guide plate 190.

Figure 11:
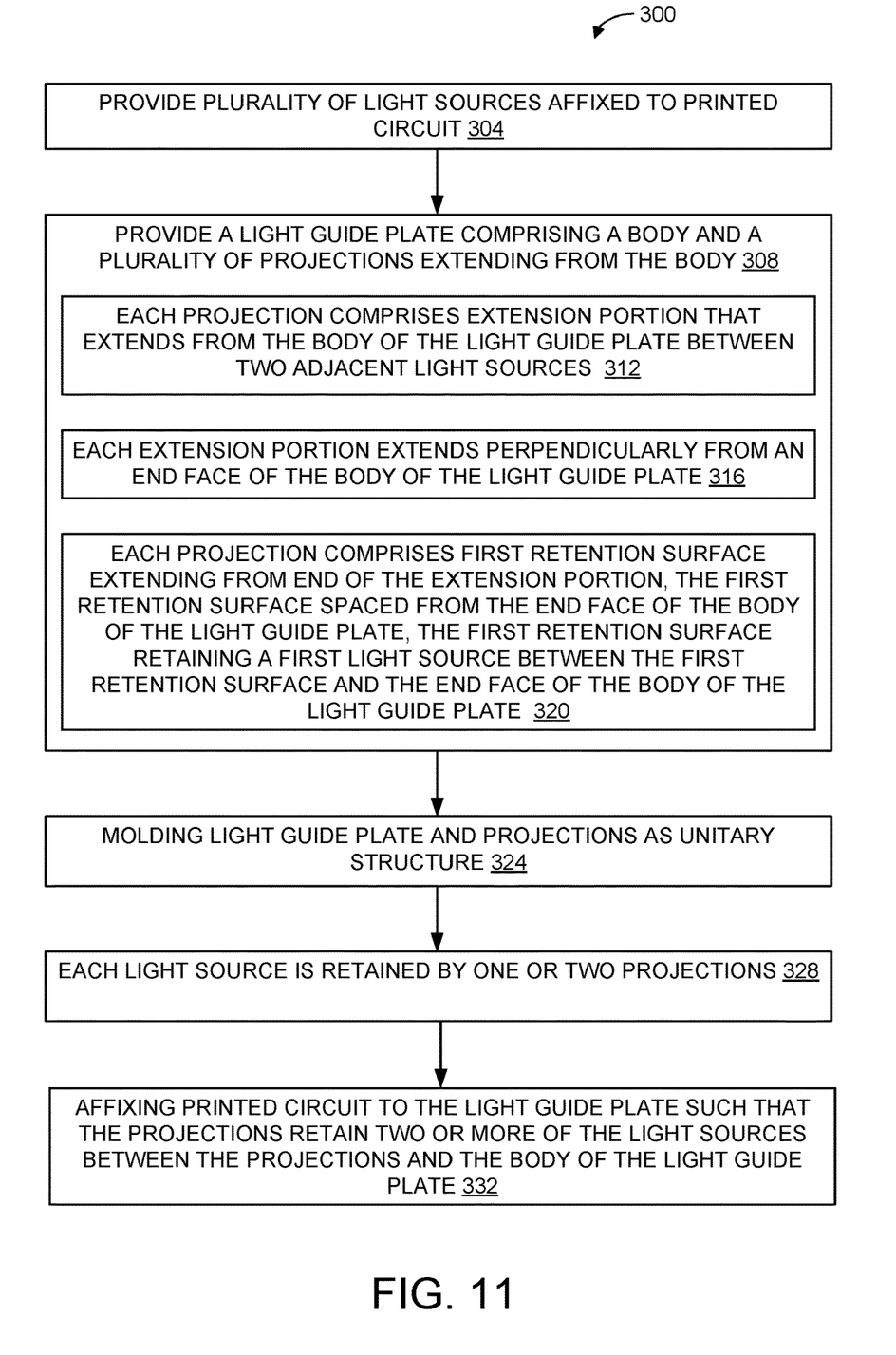
FIG. 11 shows a flow diagram of an example method for assembling a backlight module according to examples of the present disclosure.

With reference now to FIG. 11, an example method 300 is illustrated for assembling a backlight module. The following description of method 300 is provided with reference to the software and hardware components described herein and shown in FIGS. 1-8. It will be appreciated that following description of method 300 is provided by way of example and is not meant to be limiting. Therefore, it is to be understood that method 300 may include additional and/or alternative steps relative to those illustrated in FIG. 11. Further, it is to be understood that method 300 may be performed in any suitable order. Further still, it is to be understood that one or more steps may be omitted from method 300 without departing from the scope of this disclosure. It will also be appreciated that method 300 also may be performed in other contexts using other suitable components.

With reference to FIG. 11, at 304, the method 300 includes providing a plurality of light sources affixed to a printed circuit. At 308 the method 300 includes providing a light guide plate comprising a body and a plurality of projections extending from the body. At 312 the method 300 includes, wherein each projection of the plurality of projections comprises an extension portion that extends from the body of the light guide plate between two adjacent light sources of the plurality of light sources. At 316 the method 300 includes, wherein each of the extension portions extends perpendicularly from an end face of the body of the light guide plate. At 320 the method 300 includes, wherein each projection of the plurality of projections comprises a first retention surface extending from an end of the extension portion for the projection, the first retention surface spaced from the end face of the body of the light guide plate, the first retention surface retaining a first light source of the plurality of light sources between the first retention surface and the end face of the body of the light guide plate.

At 324 the method 300 includes molding the light guide plate and the plurality of projections as a unitary structure. As noted above, in some examples the light guide plate and projections are formed by an injection molding process. In other examples, the light guide plate with projections can be formed by 3D printing or other suitable manufacturing techniques. At 328 the method 300 includes, wherein each light source of the plurality of light sources is retained by one or two projections of the plurality of projections.

At 332 the method 300 includes affixing the printed circuit to the light guide plate such that the plurality of projections retain two or more of the plurality of light sources between the projections and the body of the light guide plate. In some examples, affixing the printed circuit to the light guide plate includes placing the light guide plate in a fixture, and applying the printed circuit with surface-mounted LEDs onto the light guide plate via a tacking process. A camera is utilized to determine any gaps between the LEDs and the light guide plate, and any necessary adjustments to the position of the printed circuit and LEDs relative to the light guide plate are made to meet predetermined tolerance criteria. Once the position of the printed circuit and LEDs relative to the light guide plate meets the predetermined tolerance criteria, a press or other fixture compresses the printed circuit against the light guide plate to activate the intervening pressure sensitive adhesive and thereby bond the printed circuit to the light guide plate.

For clarity, the light guide plate and the printed circuit with affixed light sources are separate components that are not mechanically coupled during their formation, and are assembled together to provide the retention functions described herein after the formation of these individual components.

Figure 12:
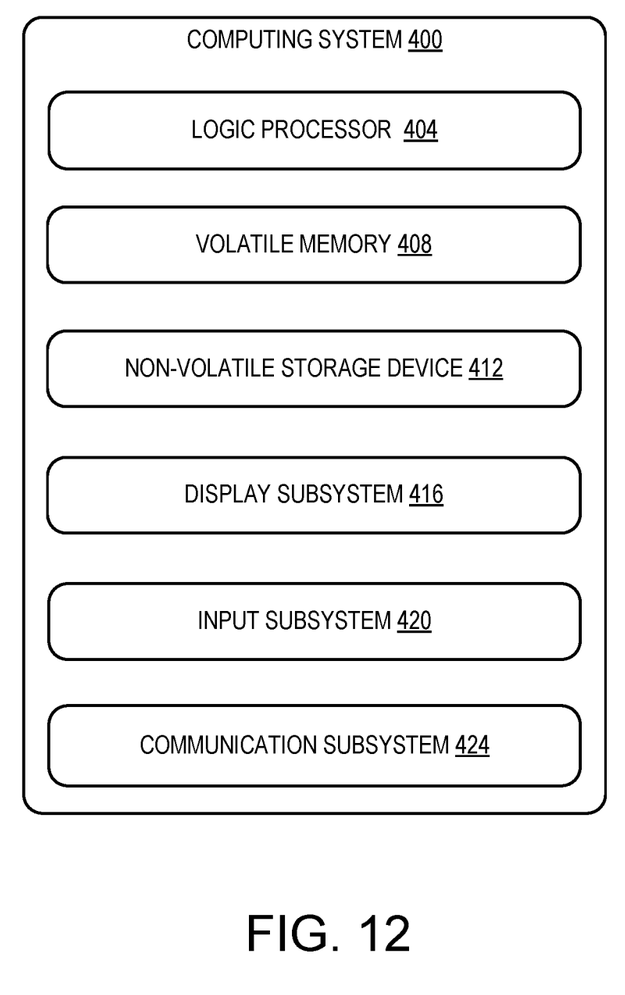
FIG. 12 shows a block diagram of an example computing system according to examples of the present disclosure.

FIG. 12 schematically shows a non-limiting embodiment of a computing system 400 that can comprise or be included in the computing devices described herein. Computing system 400 is shown in simplified form. Computing system 400 may take the form of one or more personal computers, tablet computers, desktop monitors, gaming devices, mobile computing devices, mobile communication devices (e.g., smart phones), home-entertainment computers, and/or other computing devices. In the above examples, the laptop computing device 104 may comprise computing system 400 or one or more aspects of computing system 400.

Computing system 400 includes a logic processor 404, volatile memory 408, a non-volatile storage device 412, and a display subsystem 416. Computing system 400 may optionally include an input subsystem 420, communication subsystem 424, and/or other components not shown in FIG. 12.

Logic processor 404 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 404 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 404 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 408 may include physical devices that include random access memory (RAM). Volatile memory 408 is typically utilized by logic processor 404 to temporarily store information during processing of software instructions. It will be appreciated that volatile memory 408 typically does not continue to store instructions when power is cut to the volatile memory 408.

Non-volatile storage device 412 includes one or more physical devices configured to hold instructions executable by the logic processors to implement the methods and processes described herein. When such methods and processes are implemented, the state of non-volatile storage device 412 may be transformed—e.g., to hold different data.

Non-volatile storage device 412 may include physical devices that are removable and/or built-in. Non-volatile storage device 412 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 412 may include nonvolatile, dynamic, static, read/write, read-only, sequential-access, location-addressable, file-addressable, and/or content-addressable devices. It will be appreciated that non-volatile storage device 412 is configured to hold instructions even when power is cut to the non-volatile storage device 412.

Aspects of logic processor 404, volatile memory 408, and non-volatile storage device 412 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 416 is used to present a visual representation of data held by non-volatile storage device 412. As data held by the non-volatile storage device is changed, and the state of the non-volatile storage device is thus transformed, the state of display subsystem 416 is likewise transformed to visually represent changes in the underlying data. Display subsystem 416 may include one or more display devices utilizing virtually any type of technology. Such display devices may be combined with logic processor 404, volatile memory 408, and/or non-volatile storage device 412 in a shared enclosure, or such display devices may be peripheral display devices. The liquid crystal display 100 of laptop computing device 104 is one example of display subsystem 416.

When included, input subsystem 420 may comprise or interface with the one or more user-input devices such as a keyboard, mouse, touch screen, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 424 may be configured to communicatively couple various computing devices described herein with each other, and with other devices. Communication subsystem 424 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a backlight module for a display, the backlight module comprising a light guide plate; a plurality of light sources affixed to a printed circuit; and an adhesive affixing the printed circuit to a light guide plate, wherein the light guide plate comprises a body and a plurality of projections extending from the body, the plurality of projections retaining two or more light sources of the plurality of light sources between the projections and the body of the light guide plate. The backlight module may additionally or alternatively include, wherein the light guide plate and the plurality of projections are molded as a unitary structure. The backlight module may additionally or alternatively include, wherein each projection of the plurality of projections comprises an extension portion that extends from the body of the light guide plate between two adjacent light sources of the plurality of light sources. The backlight module may additionally or alternatively include, wherein each of the extension portions extends perpendicularly from an end face of the body of the light guide plate. The backlight module may additionally or alternatively include, wherein each projection of the plurality of projections comprises a first retention surface extending from an end of the extension portion for the projection, the first retention surface spaced from an end face of the body of the light guide plate, the first retention surface retaining a first light source of the plurality of light sources between the first retention surface and an end face of the body of the light guide plate. The backlight module may additionally or alternatively include, wherein the first retention surface is positioned adjacent to a first side of the first light source that is opposite to a second side of the light source, wherein the second side is adjacent to the end face of the body of the light guide plate. The backlight module may additionally or alternatively include, wherein the first retention surface contacts the first side of the first light source. The backlight module may additionally or alternatively include, wherein the first retention surface defines a gap between the first retention surface and the first side of the first light source. The backlight module may additionally or alternatively include, wherein each projection of the plurality of projections comprises a second retention surface extending from the end of the extension portion in a direction opposite to the first retention surface, the second retention surface retaining a second light source of the plurality of light sources between the second retention surface and the end face of the body of the light guide plate. The backlight module may additionally or alternatively include, wherein the first retention surface and the second retention surface are perpendicular to the extension portion. The backlight module may additionally or alternatively include, wherein each light source of the plurality of light sources is retained by one or two projections of the plurality of projections. The backlight module may additionally or alternatively include, wherein the plurality of projections are evenly spaced across the light guide plate. The backlight module may additionally or alternatively include, wherein one or more light sources of the plurality of light sources are not retained by any projection of the plurality of projections.

Another aspect provides a method of assembling a backlight module, the method comprising providing a plurality of light sources affixed to a printed circuit; providing a light guide plate comprising a body and a plurality of projections extending from the body; and affixing the printed circuit to the light guide plate such that the plurality of projections retain two or more of the plurality of light sources between the projections and the body of the light guide plate. The method may additionally or alternatively include molding the light guide plate and the plurality of projections as a unitary structure. The method may additionally or alternatively include, wherein each projection of the plurality of projections comprises an extension portion that extends from the body of the light guide plate between two adjacent light sources of the plurality of light sources. The method may additionally or alternatively include, wherein each of the extension portions extends perpendicularly from an end face of the body of the light guide plate. The method may additionally or alternatively include, wherein each projection of the plurality of projections comprises a first retention surface extending from an end of the extension portion for the projection, the first retention surface spaced from an end face of the body of the light guide plate, the first retention surface retaining a first light source of the plurality of light sources between the first retention surface and an end face of the body of the light guide plate. The method may additionally or alternatively include, wherein each light source of the plurality of light sources is retained by one or two projections of the plurality of projections.

Another aspect provides a display comprising a backlight module that comprises: a light guide plate, a plurality of light sources affixed to a printed circuit, and an adhesive affixing the printed circuit to the light guide plate, wherein the light guide plate comprises a body and a plurality of projections extending from the body, the plurality of projections retaining two or more of the plurality of light sources between the projections and the body of the light guide plate; and a liquid crystal cell adjacent to the backlight module.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A backlight module for a display, the backlight module comprising:
   a light guide plate;
   a plurality of light sources affixed to a printed circuit; and an adhesive affixing the printed circuit to the light guide plate,
wherein the light guide plate comprises a body and a plurality of projections extending from the body, each of the plurality of projections comprising an extension portion that extends from the body of the light guide plate, and each of the plurality of projections comprising a first retention surface and a second retention surface, the two retention surfaces retaining two light sources of the plurality of light sources between the projection and the body of the light guide plate, respectively;
wherein the second retention surface extends from an end of the extension portion in a direction opposite to the first retention surface, the first retention surface retaining a first light source of the plurality of light sources between the first retention surface and an end face of the body of the light guide plate and the second retention surface retaining a different second light source of the plurality of light sources between the second retention surface and the end face of the body of the light guide plate; and
wherein the first retention surface and the second retention surface each defines a gap between said first and second retention surfaces and a first side of each of the respective first and second light sources.

2. The backlight module of claim 1, wherein the light guide plate and the plurality of projections are molded as a unitary structure.

3. The backlight module of claim 1, wherein each of the extension portions extends from the body of the light guide plate between two adjacent light sources of the plurality of light sources.

4. The backlight module of 3, wherein each of the extension portions extends perpendicularly from the end face of the body of the light guide plate.

5. The backlight module of claim 4, wherein the first retention surface is positioned adjacent to the first side of the first light source that is opposite to a second side of the light source, wherein the second side is adjacent to the end face of the body of the light guide plate.

6. The backlight module of claim 1, wherein the first retention surface and the second retention surface are perpendicular to the extension portion.

7. The backlight module of claim 1, wherein each light source of the plurality of light sources is retained by one or two projections of the plurality of projections.

8. The backlight module of claim 1, wherein the plurality of projections are evenly spaced across the light guide plate.

9. The backlight module of claim 1, wherein one or more light sources of the plurality of light sources are not retained by any projection of the plurality of projections.

10. A method of assembling a backlight module, the method comprising:
providing a plurality of light sources affixed to a printed circuit;
providing a light guide plate comprising a body and a plurality of projections extending from the body, each projection of the plurality of projections comprising an extension portion that extends from the body of the light guide plate, and each projection of the plurality of projections comprising a first retention surface and a second retention surface, wherein the second retention surface extends from an end of the extension portion in a direction opposite to the first retention surface; and
affixing the printed circuit to the light guide plate such that, for each of the plurality of projections, the two retention surfaces retain two of the plurality of light sources between the projection and an end face of the body of the light guide plate, respectively, wherein the first retention surface and the second retention surface each defines a gap between said first and second retention surfaces and a first side of each of the respective first and second light sources.

11. The method of claim 10, further comprising molding the light guide plate and the plurality of projections as a unitary structure.

12. The method of claim 10, wherein each of the extension portions extends from the body of the light guide plate between two adjacent light sources of the plurality of light sources.

13. The method of claim 12, wherein each of the extension portions extends perpendicularly from the end face of the body of the light guide plate.

14. The method of claim 10, wherein each light source of the plurality of light sources is retained by one or two projections of the plurality of projections.

15. A display, comprising:
a backlight module that comprises:
a light guide plate;
a plurality of light sources affixed to a printed circuit; and
an adhesive affixing the printed circuit to the light guide plate, wherein the light guide plate comprises a body and a plurality of projections extending from the body, each of the plurality of projections comprising an extension portion that extends from the body of the light guide plate, and each of the plurality of projections comprising a first retention surface and a second retention surface, the two retention surfaces retaining two or more of the plurality of light sources between the projection and the body of the light guide plate, respectively;
wherein the second retention surface extends from an end of the extension portion in a direction opposite to the first retention surface, the first retention surface retaining a first light source of the plurality of light sources between the first retention surface and an end face of the body of the light guide plate and the second retention surface retaining a different second light source of the plurality of light sources between the second retention surface and the end face of the body of the light guide plate, wherein the first retention surface and the second retention surface each defines a gap between said first and second retention surfaces and a first side of each of the respective first and second light sources; and
a liquid crystal cell adjacent to the backlight module.

16. The backlight module of claim 1, wherein the gap is a rear gap, and wherein a second side of each of the first and second light sources defines a front gap between said second side and the end face of the body of the light guide plate.

17. The backlight module of claim 16, wherein the front gap is 0.2 mm or less.

18. The display of claim 15, wherein the gap is a rear gap, and wherein a second side of each of the first and second light sources defines a front gap between said second side and the end face of the body of the light guide plate.

19. The display of claim 18, wherein the front gap is 0.2 mm or less.

20. The display of claim 15, wherein the light guide plate and the plurality of projections are molded as a unitary structure.

* * * * *